Figure 1:
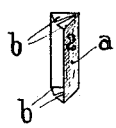

O. T. BLATHY.
METHOD OF AND MEANS FOR CALIBRATING ELECTRIC METERS.
APPLICATION FILED SEPT. 7, 1912.

1,160,567.

Patented Nov. 16, 1915.
2 SHEETS—SHEET 1.

O. T. BLATHY.
METHOD OF AND MEANS FOR CALIBRATING ELECTRIC METERS.
APPLICATION FILED SEPT. 7, 1912.

1,160,567.

Patented Nov. 16, 1915.
2 SHEETS—SHEET 2.

UNITED STATES PATENT OFFICE.

OTTO TITUS BLÁTHY, OF BUDAPEST, AUSTRIA-HUNGARY.

METHOD OF AND MEANS FOR CALIBRATING ELECTRIC METERS.

1,160,567.      Specification of Letters Patent.      Patented Nov. 16, 1915.

Application filed September 7, 1912. Serial No. 719,060.

*To all whom it may concern:*

Be it known that I, OTTO TITUS BLÁTHY, a subject of the King of Hungary, residing in Budapest, in the Kingdom of Hungary, have invented new and useful Improvements in Methods of and Means for Calibrating Electric Meters; and I do hereby declare the following to be a full, clear, and exact description of the same.

It has heretofore been the practice in the calibration of electric meters to alter the electro-dynamic braking effect procured by the action of the magnetism of a steel or permanent magnet upon a brake disk of conducting material by adjusting the brake magnet with respect to the disk or by adjusting an armature for the magnet, such armature forming a magnetic shunt for the field of the brake magnet, such field shunting armature arranged on or in front of the limbs of the brake magnet. These methods of calibration however involve the expenditure of considerable time and labor, inasmuch as more than one adjustment of the parts with subsequent testing or comparison with a standard meter is necessary before correct calibration is attained. This time and labor adds to the cost of the correctly calibrated meter. And when a micrometer screw is provided for affording such an adjustment during calibration the cost of the meter is increased and is not compensated for or outweighed by the simplification of adjustment resulting from the employment of the micrometer screw.

By my invention, however, correct calibration of a meter or series of meters can be effected by a single comparison of each meter with a standard meter accompanied by a simple effort or movement of the hand and without recourse to any adjusting apparatus or structure in the meter, with the result that the calibration is greatly simplified and the ultimate cost of production of a calibrated meter is diminished because of saving of this time and labor and the avoidance of adjusting structure.

According to my invention, I provide in each of the uncalibrated meters a braking magnet producing a somewhat stronger field than is ultimately necessary for the braking for securing correct calibration. I compare the meter with a standard meter and determine by the comparison how much too slowly the meter runs. I then apply magnet field shunting pieces of predetermined dimensions and shunting effect to the brake magnet to weaken the field of the magnet through which the disk moves to a degree just sufficient to increase the speed of the meter to correspond exactly with the standard meter.

By my invention a retardation as great as 20 per cent. below the correct speed can be compensated for with certainty by the application of these field shunting pieces, each of a previously known or predetermined shunting effect. And by preference I employ magnets which, before calibration, are, for example, 5 per cent. stronger than necessary to produce the correct braking effect. The field shunting pieces are produced in large numbers and of different dimensions, and when applied to the braking magnet produce a predetermined weakening of the magnetic field in proportion to their dimensions. The dimensions of the different shunting pieces are selected in such manner that within the limits of the retardation to be corrected, the necessary correction can be effected by steps or increments of, for example, one quarter of one per cent. The shunting pieces are sorted out and all those of a given dimension or shunting effect are kept together. These shunting pieces are all preferably of the same length but of different cross sectional areas, as by stamping them out of plates of different thicknesses or cutting them from wires of different diameters, so that they may be sorted according to their weights, as by means of automatic scales.

The calibration according to my invention is practised as follows: A series of meters to be calibrated are connected in circuit in the usual manner with a standard meter, and the amount of retardation of each meter determined in the well known manner. Then the field shunting piece, or a number of pieces, whose effect will be to weaken the field of the magnet sufficiently to bring up the speed of the meter to the correct value is or are applied to the brake magnet, as by placing it or them across the poles of the magnet. For the production of the field shunting pieces a metal or an alloy having relatively low permeability is preferably employed to the end that slight variations in the small dimensions of the shunting pieces such as are unavoidable when sorting may not injuriously affect the accuracy required in the calibration. These field shunting or armature pieces may conveniently be produced from pure nickel, since this metal can be obtained commercially of the necessary uniformity in its magnetic properties that accuracy is assured even when they are manufactured wholesale.

My invention resides in the method of and means for effecting calibration of meters.

Figure 2:
Figure 3:
Figure 4:
Figure 5:
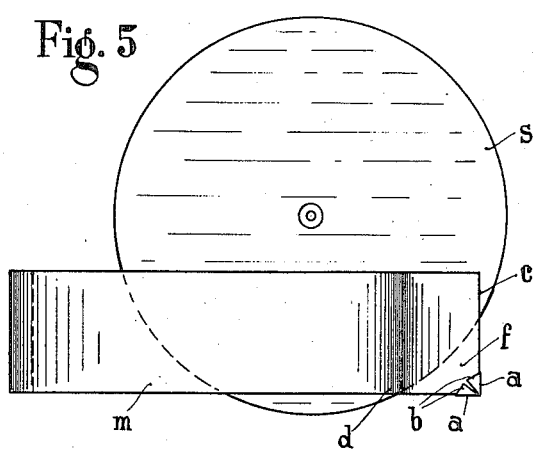
Figure 6:
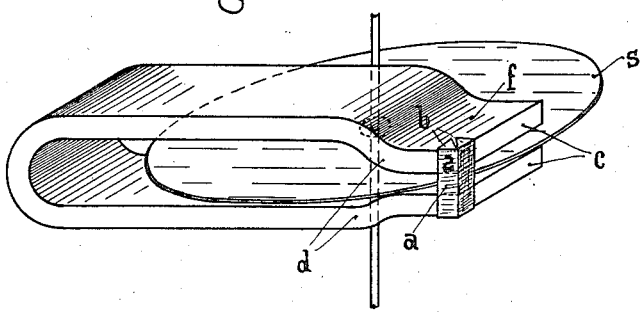
Figure 7:
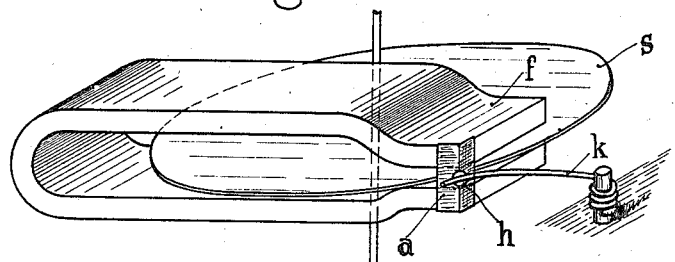
Figure 8:
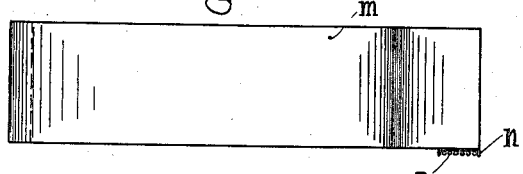
Figure 9:
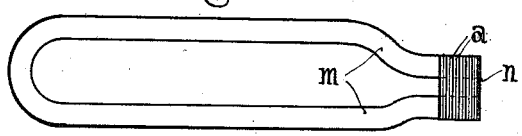
Figure 10:
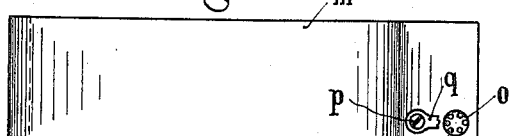
Figure 11:
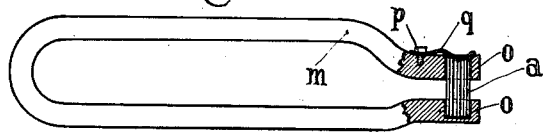

For an illustration of my method of and means for effecting the calibration, reference may be had to the accompanying drawings, in which:

Figure 1 illustrates one form a field shunting or armature piece may take. Fig. 2 shows a modified form. Fig. 3 shows a further modified form. Fig. 4 shows a front view of the form shown in Fig. 3. Fig. 5 is a plan view showing braking magnet and disk with a shunting piece such as shown in Fig. 1 applied to the magnet. Fig. 6 shows in perspective the structure illustrated in Fig. 5. Fig. 7 shows a brake magnet and disk in perspective with a shunting piece such as shown in Figs. 3 and 4 applied to the magnet, together with means for holding the shunting piece in position. Fig. 8 shows in top plan view a braking magnet with shunting pieces applied thereto in another way. Fig. 9 is a side elevation of the structure shown in Fig. 8. Fig. 10 is a top plan view of a brake magnet having applied thereto shunting pieces disposed in holes in the poles of the magnet. Fig. 11 is a side elevation, partly in section, of the structure shown in Fig. 10.

Referring to Fig. 1, the armature piece or field shunting piece $a$ is formed out of a thin plate or metal bent at right angles and having end portions $b$ bent down at right angles to the sides. This piece is applied as indicated in Figs. 5 and 6 to the corners $f$ of the poles of the brake magnet $m$ within whose magnetic field is disposed the disk S secured to the meter shaft for retarding it. The poles $f$, of the magnet $m$, stand clear of or extend beyond the edge of the disk S and the piece $a$ is so applied to the magnet poles that the side portions of the piece $a$ are attracted to and adhere to the surfaces $c$ of the magnet, while the end portions $b$, $b$ of the shunting piece $a$ form abutments resting on the upper and lower horizontal surfaces of the magnet poles and so prevent sliding or displacement of the piece $a$, the attraction of the magnet on the piece $a$ being sufficient to hold it in position.

The armature pieces or shunting pieces which serve to compensate for the varying retardation may differ from one another either in gage of the plate used or in breadth, that is to say, they vary in their cross sectional area; or in certain cases they may differ from each other in magnetic permeability of the material of which they are made. The various armature pieces or shunting pieces may conveniently be provided with markings (see the mark "2" in Figs. 1 and 6) which indicate the amount of acceleration they will effect when applied to the magnet.

As shown in Fig. 2, the shoulders $g$ are provided and serve to prevent longitudinal sliding of the piece.

As indicated in Figs. 3 and 4, holes $h$ may be stamped out of the pieces for the purpose or reducing the cross sectional area, and thereby reducing the shunting effect of comparatively wide armature or shunting pieces. When such a piece as illustrated in Figs. 3 and 4 is employed or pieces similar thereto, a spring $k$ may bear against the piece, or any other suitable means employed to prevent its falling off or displacement due to jarring or the like.

It is to be understood that the forms of structure illustrated in the accompanying drawings serve as examples only, and that the armature pieces or shunting pieces may vary in their form in many ways without departing from the scope and spirit of my invention.

Instead of employing different armature pieces for correcting different amounts of retardation, a greater or lesser number of armature pieces may be applied to the magnet according to the amount of retardation to correct. Thus, as illustrated in Figs. 8 and 9, a plurality of shunting pieces $a$, for example nickel wires, are applied across the poles of the magnet $m$, the wires being held by the attraction of the magnet. A member $n$ of non-magnetic material may intervene between the wires $a$ and the poles of the magnet. In the case of Figs. 10 and 11, the holes of the magnet $m$ are bored near the pole corners which stand clear of the braking disk, to form the holes $o$, the hole $o$ in the lower limb extending only partially therethrough as indicated in Fig. 11. The armature pieces $a$, as of nickel wire, are placed in these holes, and held there by magnetic attraction. In order to further secure these wires a spring $q$ pivoted on screw $p$ may be provided to extend across the hole $o$ in the upper limb after the wires have been inserted.

Suppose the meter requires, upon comparison with the standard meter, an acceleration of 2 per cent. As soon as this is determined, in the well known manner, the calibrater simply applies to the poles of the magnet a single piece $a$ whose predetermined effect is such as to produce a shunting of the magnet $m$ as will produce an acceleration of 2 per cent. The calibrater need not then again compare the meter with the standard meter, thus reducing the cost of production which is also reduced in that no additional structure within the meter is required for the field adjustment. Or upon comparison with the standard meter it being determined that an acceleration of 1.5 per cent. is required, the calibrater may apply, as indicated in Figs. 8 to 11 inclusive, six shunting pieces $a$ each of which has been predetermined to have an accelerating effect of one quarter of one per cent. Having applied these six pieces he knows that his meter is correctly calibrated and he need not again compare it with the standard meter.

Obviously what has been said of one meter, is true of a series of meters which may be simultaneously connected in circuit with the standard meter.

What I claim is:

1. The method of calibrating an electric meter governed by electro-dynamic braking, which consists in determining the retardation of said meter on comparison with a standard meter, and thereafter weakening the magnetic field of the electro-dynamic braking system by placing on the magnet of said field in fixed relation therewith a piece or pieces forming a shunt path or paths of previously determined accelerating effect, whereby said meter is accelerated to correct speed.

2. The method of calibrating an electric meter governed by electro-dynamic braking, which consists in determining the retardation of said meter on comparison with a standard meter, and thereafter introducing into the magnetic field of the electro-dynamic braking system in fixed relation to the magnet thereof a magnetically permeable piece or pieces having previously determined weakening effect upon said magnetic field, whereby said meter is at once accelerated to the correct speed.

3. The method of calibrating an electric meter governed by electro-dynamic braking, which consists in determining the retardation of said meter on comparison with a standard meter, and thereafter weakening the magnetic field of the electro-dynamic braking system by shunting said magnetic field through a path or paths without variable air gap or gaps and of previously determined accelerating effect, whereby said meter is at once accelerated to correct speed without further comparison with said standard meter.

4. The method of calibrating an electric meter governed by electro-dynamic braking, which consists in determining the retardation of said meter on comparison with a standard meter, and thereafter introducing into the magnetic field of the electro-dynamic braking system a magnetically permeable piece or pieces in fixed relation and in contact with the magnet poles and having previously determined weakening effect upon said magnetic field, whereby said meter is at once accelerated to correct speed without further comparison with said standard meter.

5. The combination with a meter braking magnet and disk, of a magnet shunting piece of previously determined field weakening effect applied in fixed position to said magnet.

6. The comination with a meter braking magnet and disk, of a magnet shunting piece of previously determined field weakening effect applied upon the poles of said magnet and out of the path of said disk.

7. The combination with a meter braking magnet and disk, of a magnet shunting piece of previously determined field weakening effect of material of lower permeability than that of iron applied upon the poles of magnet.

8. The combination with a meter braking magnet and disk, of a magnet shunting piece of previously determined field weakening effect of material of lower permeability than that of iron applied in contact with the poles of said magnet and out of the path of said disk.

9. The combination with a meter braking magnet and disk, of a nickel magnet shunting piece of previously determined field weakening effect applied upon the poles of said magnet.

10. The combination with a meter braking magnet and disk, said magnet having pole corners standing free of said disk, and a magnet shunting piece consisting of an angle plate applied to said magnet at said pole corners.

11. The combination with a meter braking magnet and disk, of a plurality of magnet shunting pieces applied to said magnet, each of said pieces having previously determined field weakening effect.

12. The method of calibrating an electric meter governed by electro-dynamic braking, which consists in making a single comparison of said meter with a standard meter, determining from said comparison the retardation of said meter, and thereafter weakening the magnetic field of the electro-dynamic braking system by applying to the magnet of said system and in fixed relation to said magnet a piece or pieces forming a path or paths having previously determined accelerating effect equal to that necessary to bring said electric meter up to correct speed.

13. The method of calibrating an electric meter governed by electro-dynamic braking, which consists in determining the retardation of said meter on a single comparison with a standard meter, providing field shunting pieces of previously determined field weakening power, introducing one or more of said pieces into the field of the electro-dynamic braking system in fixed relation to the magnet thereof to such number that their combined effect upon said magnetic field accelerates said meter to correct speed.

14. The combination with a meter braking system comprising a disk and a magnet initially producing a field co-acting with said disk to cause the meter to run below desired speed, of a field shunting piece applied to and in fixed relation with said magnet and having a previously determined field weakening effect such as to bring the speed of the meter up to correct value.

15. The combination with a meter braking magnet and disk, of a magnet shunting piece consisting of an angle plate having faces substantially parallel with and in fixed relation with the faces of a pole of said magnet.

16. The combination with a meter braking magnet and disk, of a magnet shunting piece consisting of an angle plate applied to the poles of said magnet, said plate having an abutment preventing displacement of said plate.

17. The method of calibrating an electric meter governed by an electro-dynamic braking system comprising a normally too powerful magnet and a conductor movable with respect thereto, which consists in determining the retardation of said meter, and thereafter placing in fixed relation on said magnet a shunting piece or pieces of predetermined field weakening effect, whereby the effect of said braking system is at once reduced to correct amount.

In testimony whereof, I have signed my name to this specification in the presence of two subscribing witnesses.

OTTO TITUS BLÁTHY.

Witnesses:
HUGH KEMEING,
JOHN J. ROUTS.